(12) United States Patent
Wonderlich

(10) Patent No.: US 8,408,478 B2
(45) Date of Patent: Apr. 2, 2013

(54) PRODUCT DISTRIBUTION APPARATUS WITH SYSTEM AND METHOD OF AUTOMATIC METER CALIBRATION

(75) Inventor: Grant J. Wonderlich, Rock Island, IL (US)

(73) Assignee: Deere & Company, Moline, IL (US)

( * ) Notice: Subject to any disclaimer, the term of this patent is extended or adjusted under 35 U.S.C. 154(b) by 308 days.

(21) Appl. No.: 12/860,478

(22) Filed: Aug. 20, 2010

(65) Prior Publication Data
US 2012/0042815 A1  Feb. 23, 2012

(51) Int. Cl.
*A01G 25/09* (2006.01)
*B05B 3/00* (2006.01)
*B05B 3/18* (2006.01)
*B05B 9/00* (2006.01)
*B05B 17/00* (2006.01)

(52) U.S. Cl. ............ 239/1; 239/147; 239/602; 239/722; 222/1; 222/58; 222/71; 111/200; 111/900; 111/903; 111/177; 701/50; 406/19

(58) Field of Classification Search ................. 111/200, 111/900, 903, 904, 174, 177, 176, 170; 701/50, 701/58; 340/684, 674, 673; 172/2–7; 406/120, 406/26, 19, 12, 10; 239/1, 8, 11, 146, 147, 239/172, 722, 602; 222/1, 52, 58, 71, 575
See application file for complete search history.

(56) References Cited

U.S. PATENT DOCUMENTS
6,584,920 B1   7/2003  Cresswell

FOREIGN PATENT DOCUMENTS
CA    2311698    12/2001
GB    2105162    3/1983

OTHER PUBLICATIONS
European Search Report, received Dec. 9, 2011,(4 pages).

*Primary Examiner* — Christopher J. Novosad

(57) ABSTRACT

A product distributing apparatus is described as well as a system and method of automatically calibrating the meter of the apparatus which does not require the operator to leave the operator station of the towing vehicle. One application of such an apparatus and method is in an agricultural air seeder and it is in this context that the apparatus is described.

9 Claims, 5 Drawing Sheets

PRODUCT DISTRIBUTION APPARATUS WITH SYSTEM AND METHOD OF AUTOMATIC METER CALIBRATION

DETAILED DESCRIPTION

A product distributing apparatus is described as well as a system and method of automatically calibrating the meter of the apparatus which does not require the operator to leave the operator station of the towing vehicle. One application of such an apparatus and method is in an agricultural air seeder and it is in this context that the apparatus is described. In the figures.

Figure 1:
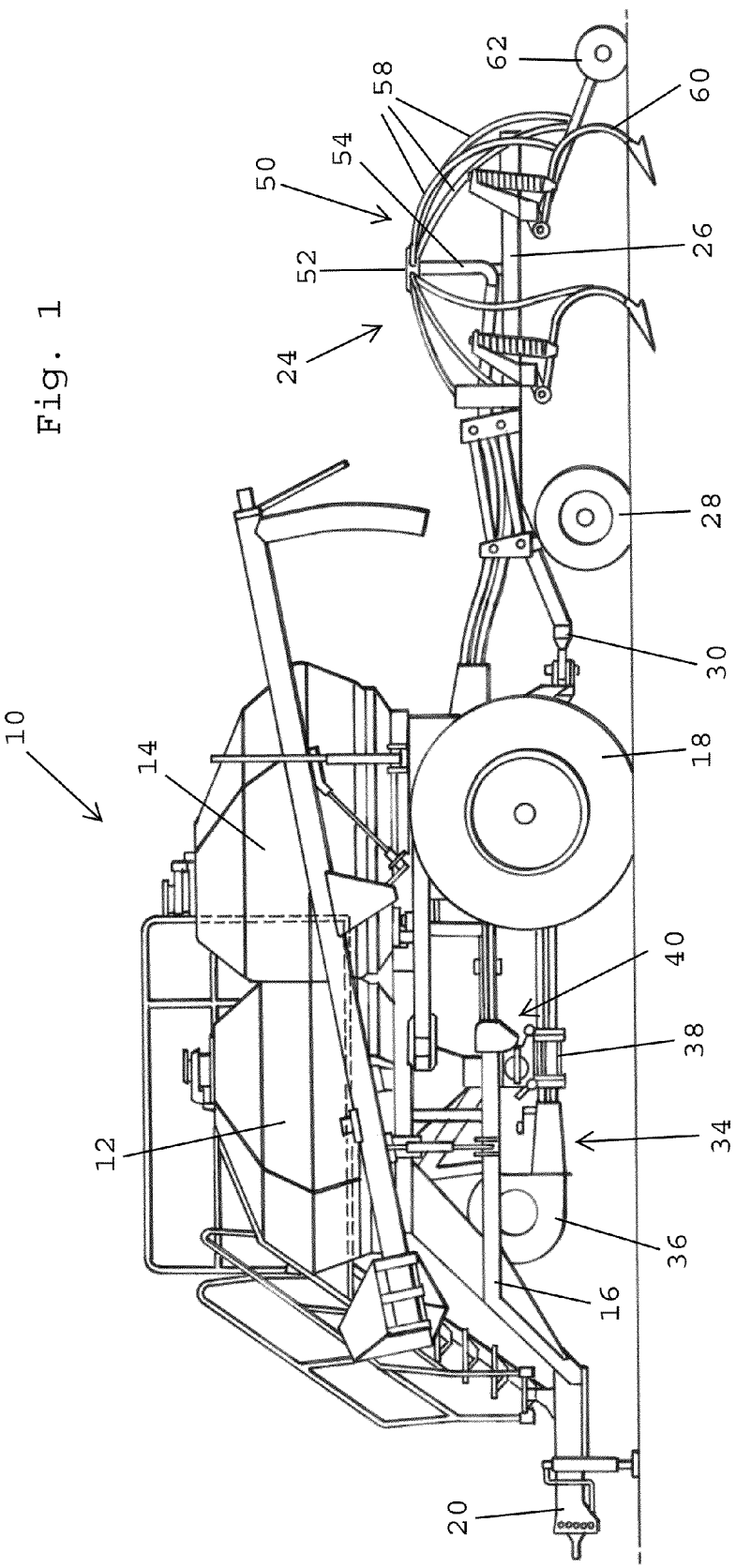
FIG. 1 is a side elevation view of an agricultural air seeder.

Referring to FIG. 1, therein is shown an agricultural seeding and fertilizing implement 10 commonly referred to as an air seeder. Implement 10 includes tanks 12 and 14 for containing product to be distributed to the soil. The tanks 12 and 14 are mounted on a frame 16 supported by ground wheels 18 for forward movement over the ground by a towing vehicle (not shown) connected to a forward hitch 20. A ground-engaging implement 24 includes a frame 26 supported by ground wheels 28 and connected to the rear of the frame 16 by a hitch 30. Alternative arrangements may place the ground engaging implement in front of the air seeder or the air seeder and the ground engaging implement can be combined onto a common frame. The tanks 12 and 14 can be any suitable device for holding the material to be dispensed. They could be hoppers, bins, boxes, containers, etc. The term "tank" shall be broadly construed herein.

A product distribution system 34 includes a fan 36 connected to a product delivery conduit structure 38. The fan 36 directs air through the conduit structure 38. A product metering mechanism 40, located at the bottom of each tank 12 and 14, only one of which is shown in FIG. 1, delivers the products from the tanks 12 and 14 to the conduit structure 38. The delivery conduit structure 38 consists of an upper rank 42 (FIG. 2) of individual conduits 44 passing through distribution manifold 39 beneath each meter and a lower rank 46 of individual conduits 48 passing through distribution manifold 39 beneath each meter. An example of such a distribution system is the John Deere 1910 Commodity Air Cart which is shown in detail in U.S. Pat. No. 6,213,698, incorporated herein by reference. Each conduit 44, 48 carries product rearwardly in the air stream to a secondary distribution tower 50. Although multiple conduits are shown, in other arrangements, a single conduit is used to convey product to distribution towers described below. Typically, there will be one tower 50 for each conduit 44, 48 of the conduit structure. Each tower 50 includes an uppermost distributing head 52 located at the uppermost end of a vertical distribution tube 54. The head 52 evenly divides the flow of product into a number of secondary distribution lines 58. Each secondary distribution line 58 delivers product to a furrow formed by one of a plurality of openers 60 attached to the frame 26 at transversely spaced locations. A trailing firming or closing wheel 62 associated with each opener 60 firms the soil over the material deposited in the furrow. The implement 10 may be equipped with separate conduit structures 38 for each of the tanks 12 and 14 whereby different products can be distributed separately. Alternatively, the products from tanks 12 and 14 can be combined in the manifold into a common conduit structure 38 for distribution together. In other embodiments of the distribution system, the conduits may be selectively configurable to combine the products from tanks 12 and 14 into common conduits or to not combine the products. While two tanks 12 and 14 are shown with the associated metering mechanisms 40 and conduit structures 38, it will be understood that any number of tanks, etc. can be provided on the implement 10 as desired. The metering mechanism for both tanks are identical. Only tank 12 and its metering mechanism 40 are described below.

Figure 2:
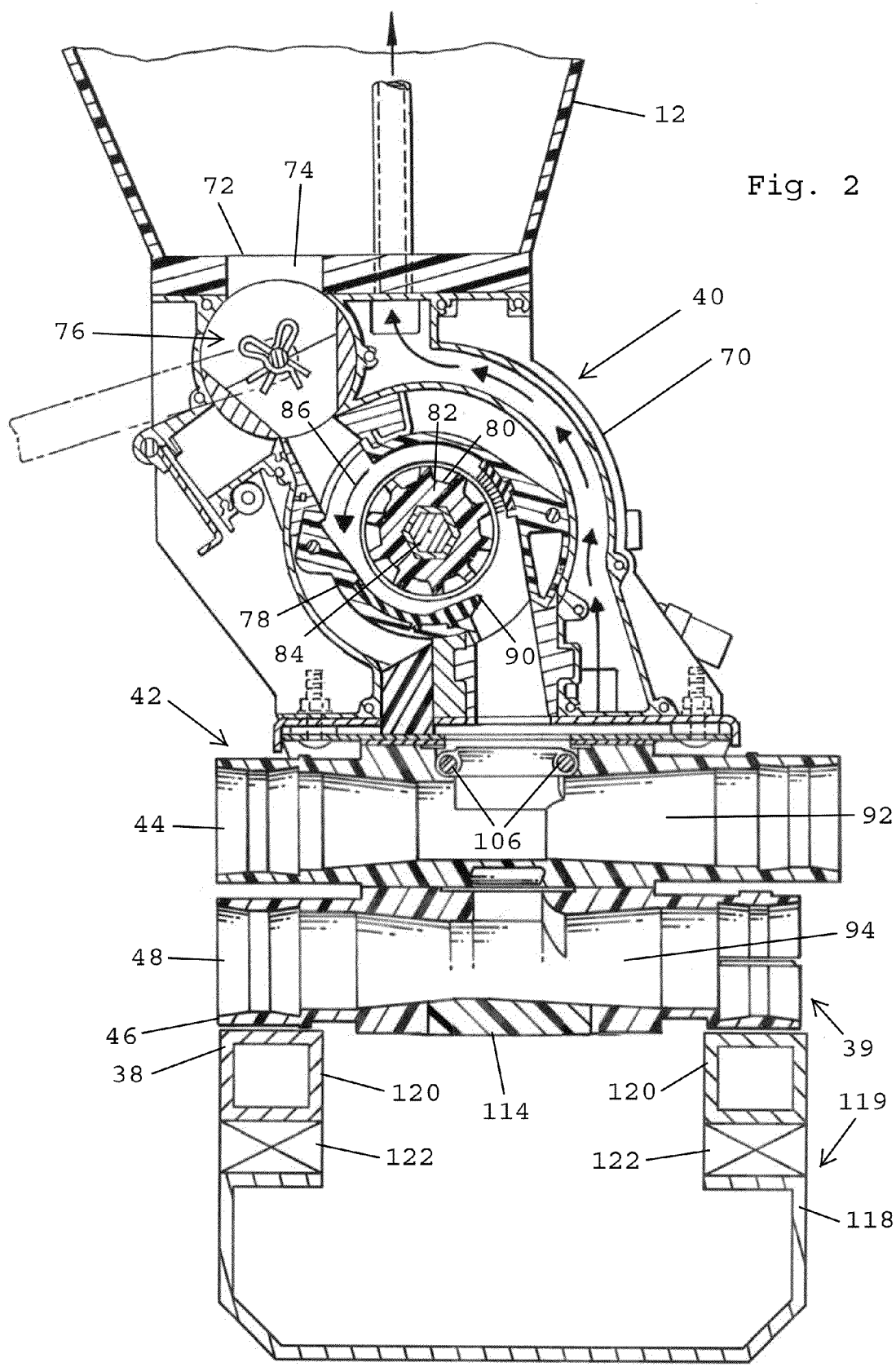
FIG. 2 is side elevation view of the metering mechanism and distribution manifold.

With reference to FIG. 2, the metering mechanism 40 is shown in greater detail. The metering mechanism 40 includes a meter housing 70 attached to the lower end of the tank 12. The housing 70 has an upper opening 72 to receive product from the tank 12 into a product passage 74 extending through the meter housing. The product passage includes a disconnect valve 76 that can be rotated from the open position shown to a closed position that prevents product from flowing to the meter. In the open position of the disconnect valve 76 shown, product is allowed to flow through the passage 74 to the meter cartridge 78. Cartridge 78 carries a meter roll 80 consisting of a series of fluted a roller segments 82 on a drive shaft 84. A meter drive motor 134 rotates the shaft 84. The meter drive motor can be electrical, hydraulic or mechanical and is preferably variable speed or a variable speed transmission is placed between the motor 134 and the drive shaft 84. The meter may also be driven by a ground drive with a variable speed input to a transmission. In operation, the meter roll 80 rotates counterclockwise as shown by the arrow 86 to regulate the flow of product through the cartridge 78 over the lip 90. From there, product continues to flow through the housing 70 to the conduit structure 38.

Figure 3:
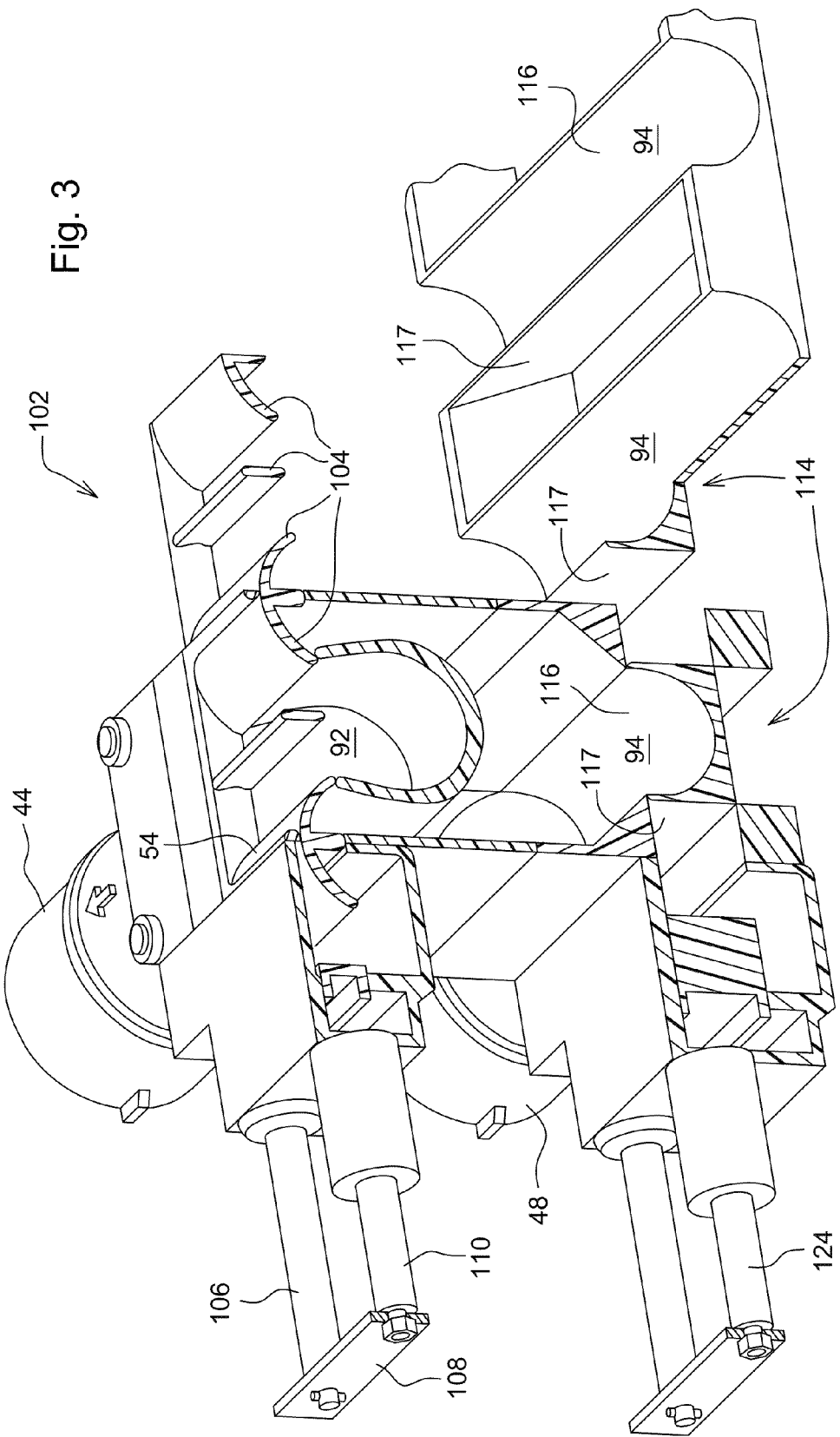
FIG. 3 is a perspective partial cross section view of the distribution manifold showing the selector valves in one position.
Figure 4:
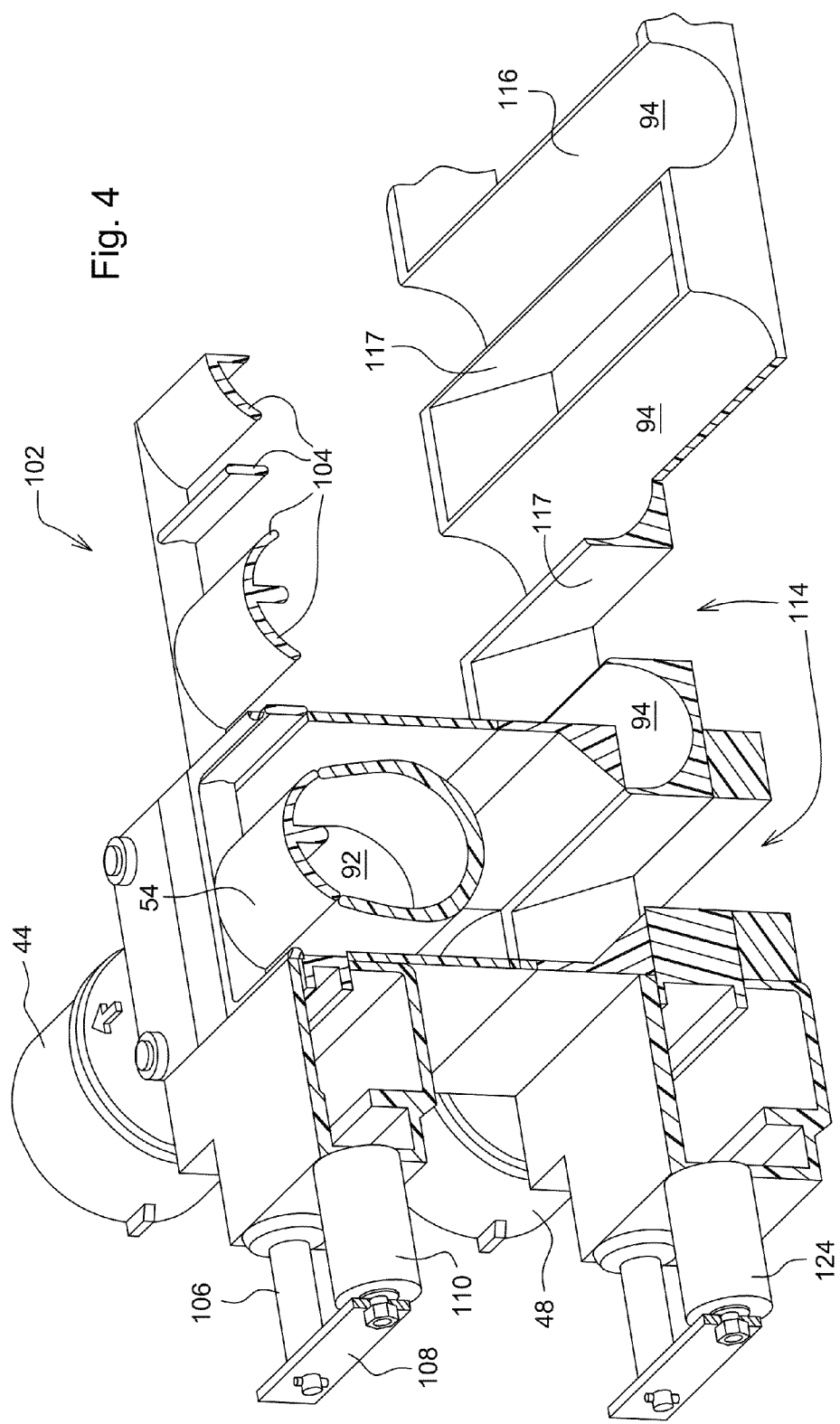
FIG. 4 is a perspective partial cross section view of the distribution manifold like FIG. 3 showing the selector valves in the other position.

Each conduit 44 in the upper rank 42 has a venturi 92 to draw product into the air flowing through the conduits 44. Likewise, each conduit 48 in the lower rank 46 has a venturi 94. They distribution manifold 39 has a selector valve 102 (FIG. 3) at the upper end where the manifold receives product from the metering housing 70. The selector valve 102 directs product to either the upper rank or lower rank of conduits. When the selector valve 102 is in its first position as shown in FIG. 3, product from the metering mechanism 40 is directed to the top rank of venturis 92 and blocked from the bottom rank of venturis 94 by convex a valve members 104. When the selector valve 102 is in its second position as shown in FIG. 4, product from the meter mechanism 40 is directed to the lower rank of venturis 94 and blocked from the upper rank of venturis 92. The selector valve 102 has a pair of transversely extending rods 106 which connect the convex valve members 104. On one lateral side, the rods 106 are connected by a bar 108. An actuator 110 between the bar 108 and the housing is used to move the selector valve 102 between the first and second positions. The actuator 110 can be any electromechanical device, such as a solenoid, hydraulic cylinder, or pneumatic cylinder, etc. The purpose of the actuator 110 is to enable the operator to move the selector valve 102 from the operator station by input to a controller. Automatic operation of the actuator 110 is performed by the controller during a calibration process described below. The selector valve 102 is only needed because the distribution system shown is a double shot system having two ranks of conduits.

A calibration valve 114 is provided in the manifold 39 at the bottom of the venturis 94. The calibration valve 114 has a closed position shown in FIG. 3 in which the bottom of the venturis 94 are closed, enabling product to flow through the conduits 48 of the lower rank 46. That is, product can flow through the conduits 48 when the selector valve 102 is in the first position shown in FIG. 3. Returning again to the calibration valve 114, the valve has concave portions 116 that form of the lower surface of the venturis 94. The valve 114 is slidable in the distribution manifold between the open and closed positions. In the open position, FIG. 4, the openings 117 in the valve are in the bottom of the venturis 94, allowing product to flow downward out of the distribution manifold. The position of the calibration valve 114 is also controlled by a linear actuator 124. Actuator 124 can be electromechanical, such as a solenoid, or hydraulic or pneumatic as desired. Again, the actuator enables the calibration valve to be operated remotely by the controller.

Returning again to FIG. 2, a scale 119 is mounted below the distribution manifold 39 on the frame 120. When the calibration valve 114 is in the open position, product that flows through the distribution manifold and is captured by the scale to enable the quantity of product metered during a calibration process to be measured. The scale, as shown, includes a catch basin 118 mounted to the frame 120 by load cells 122 or other sensors capable of measuring load.

Figure 5:
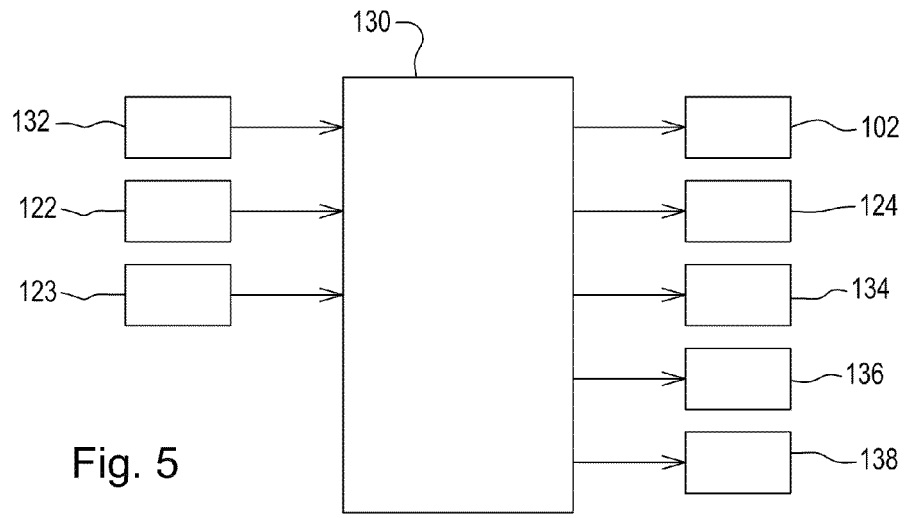
FIG. 5 is a schematic diagram of the control system for the implement.

A machine controller 130 (FIG. 5) is provided to control the operation of the implement 10. A portion of the inputs to the controller include an implement speed from a speed sensor 132, the weight of product in the catch basin 118 during the calibration process as described below from the load cells 122 and the number of revolutions of the meter during the calibration process as determined by a rotation sensor 123. Outputs from the controller include the control of the actuators 102 and 124 for the valves 102 and 114; control of the meter drive motor 134, the fan motor 136 and the fan diverter valve 138 as described below.

Volumetric meters of the type shown in FIG. 2 require calibration to set the amount of product to be delivered for a given unit of area covered by the apparatus. This may be expressed as pounds per acre or other similar units. With each different product, the meter needs calibration. Even different batches of the same product may require calibration for precise distribution of product. Furthermore, if the product settles in the tank during use due to vibration, etc during operation, it may be necessary to repeat the calibration process every so often during operation. Calibration is accomplished by operating the meter for a period of time during which the number of revolutions of the meter are captured and weighing the product metered during that time. This data is then used to calculate a metered amount per revolution of the meter. The meter drive motor 134 is then driven at the desired speed based on the implement travel speed to deliver the desired amount of product per unit area.

The described apparatus automates the calibration process. The operator initiates the calibration process by input to the controller. The controller then moves the selector valve 102 to the second position shown in FIG. 4 if the valve is not already in that position to allow product to bypass the upper rank of conduits 44. The calibration valve 114 is moved to the open position shown in FIG. 4. The meter is operated for a period of time and the number of revolutions of the meter are recorded. During the calibration process, the fan 36 is not operated. The product from the meter is captured in the catch basin 118 and weighed. The weight of product in the catch basin and the number of meter revolutions is used to determine meter rate in terms of mass per revolution. The controller then controls the meter speed based on the travel speed of the apparatus as detected by the speed sensor 132 to deliver the product at a desired rate.

Figure 6:
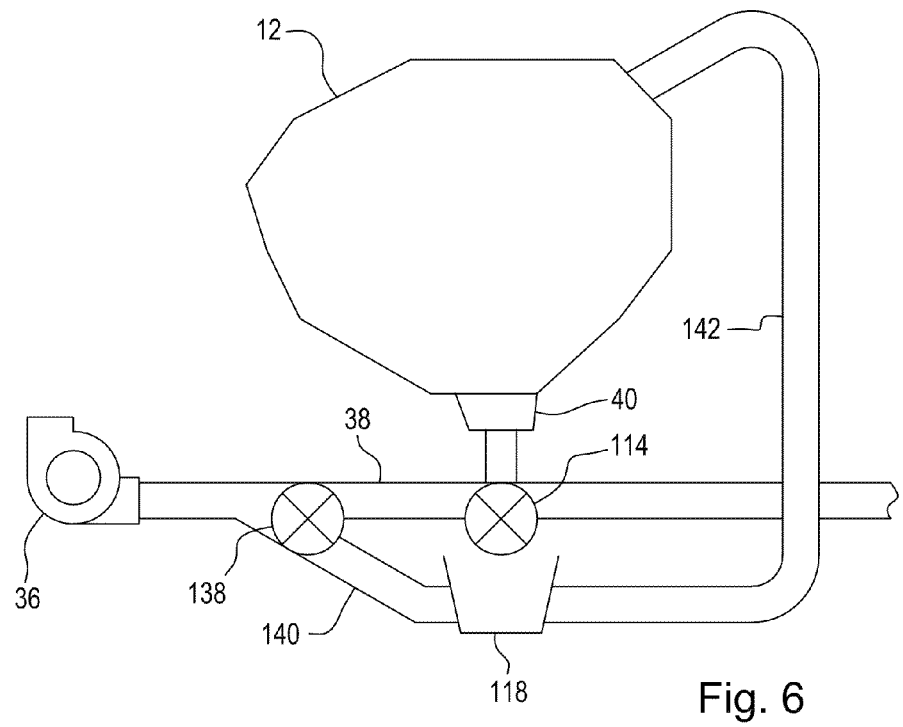
FIG. 6 is a schematic diagram of a pneumatic return system.

At the conclusion of the meter calibration process, the calibration valve 114 is closed and the selector valve 102 is moved to the desired position, if necessary. The product in the catch basin 118 is also returned to the tank 12. A schematic diagram of a pneumatic return system is shown in FIG. 6. Air flow from the fan 36 is controlled by diverter valve 138 that directs the air into either the conduit structure 38 or to the catch basin 118 through the line 140. From the catch basin, the air blows the product through the return line 142 to the tank 12. Once the catch basin is emptied of product, the diverter valve 138 is switched to supply air to the conduit structure 38 for normal operation of the apparatus. A mechanical return could also be provided. In one mechanical return system, a trough at the bottom of the catch basin is equipped with an auger to move product to one lateral side of the catch basin. An elevator such as a paddle elevator them moves the product upward to the top of the tank. To compensate for the possibility that some product remains in the catch basin, the catch basin can be weighed at both the beginning and end of the calibration process so only the weight of product introduced into the catch basin during the calibration process is used to calibrate the meter.

Having described the preferred embodiment, it will become apparent that various modifications can be made without departing from the scope of the invention as defined in the accompanying claims.

The invention claimed is:

1. A product distribution apparatus comprising:
a frame supported at least in part on wheels for movement over a surface;
a tank for holding a product to be distributed
a meter adapted to control a rate of discharge of product from the tank;
a product distribution system receiving product from the meter
a scale for selectively weighing a quantity of product from the tank; and
a calibration valve to selectively direct product flowing from the meter to one of the distribution system and the scale.

2. The apparatus of claim 1 wherein the scale includes a catch basin mounted to the frame by one or more load cells conFig.d to measure the weight of product in the catch basin.

3. The apparatus of claim 1 further comprising a controller and actuator to control the position of the calibration valve.

4. The apparatus of claim 3 wherein the controller is operably connected to the scale to receive input there from and to a meter drive motor to control the meter.

5. The apparatus of claim 4 further comprising a speed sensor to detect the speed of travel of the apparatus.

6. The apparatus of claim 1 further comprising means for returning product from the scale to the tank.

7. The apparatus of claim 1 further comprising a return line from the scale to the tank, and a fan adapted to blow air through the scale to move product from the scale through the return line to the tank.

8. A method of calibrating a meter in a product distribution apparatus, the apparatus having a frame support at least in part on wheels for movement over a surface, a tank for holding a product to be distributed, a meter adapted to control a rate of discharge of product from the tank, a distribution system receiving product from the meter, a scale for selectively weighing a quantity of product from the tank; and a calibration valve to selectively direct product from the meter to one of the distribution system and the scale; the method comprising:

moving the calibration valve to a position to direct product from the meter to the scale;

operating the meter for a period of time while capturing the number of revolutions of the meter during which the product discharged by the meter is collected in the scale;

weighing the product collected in the scale;

determining a product discharge rate per revolution of the meter; and moving the calibration valve to a position to direct product from the meter to the distribution system.

9. The method of claim 8 further comprising using the determined product discharge rate to control the meter to discharge product at a desired rate.

* * * * *